(No Model.)
W. SCHILLING.
SCREW.
No. 272,778. Patented Feb. 20, 1883.
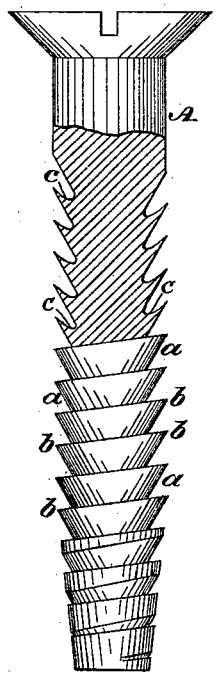
WITNESSES:
F. Cooper.
W. F. Kircher
INVENTOR:
Wm Schilling,
BY John A. Wiedersheim
ATTORNEY.

United States Patent Office.

WILLIAM SCHILLING, OF PHILADELPHIA, PENNSYLVANIA, ASSIGNOR TO DAVID CAMPBELL AND WILLIAM HUGHES, BOTH OF SAME PLACE.

SCREW.

SPECIFICATION forming part of Letters Patent No. 272,778, dated February 20, 1883.

Application filed August 21, 1882. (No model.)

*To all whom it may concern:*

Be it known that I, WILLIAM SCHILLING, a citizen of the United States, residing at Philadelphia, in the county of Philadelphia, State of Pennsylvania, have invented a new and useful Improvement in Screws, which improvement is fully set forth in the following specification and accompanying drawing, in which the figure is a side elevation, partly sectional, of the screw embodying my invention, this consisting in constructing the screw of tapering form, the threads being angular in vertical section, the outer angles pointing toward the head of the screw, and the upper face of the threads being countersunk, so as to obtain for said face a space or large surface for the wood, whereby the holding power of the screw is increased and its retraction accomplished with difficulty.

Referring to the drawing, A represents the screw, which is formed with threads $a$, of angular form in vertical section, the outer angles, $b$, pointing toward the head of the screw. The upper face of the threads is countersunk, as at $c$, thus forming a depression, which begins at the outer angle of the thread and continues to the place of junction of said upper face with the side or lower face of the adjacent thread. When the screw is driven into the wood the latter closes around the threads and fills the countersunk portion or depression $c$, it being seen that the latter provides a large surface for the engagement of the wood and a large space into which the wood enters, whereby the screw has an increased holding power and its retention in the wood is assured, the construction of the threads also increasing the difficulty of retracting or withdrawing the screw, and preventing loosening of the latter. The screw may be readily driven into the wood by blows on its head, the upwardly-projecting angles of the thread presenting no obstacle thereto, the wood afterward entering the countersunk or depressed portions $c$ and holding the screw, as has been stated. The screw has a tapering end or point, thus enabling it to be more readily driven into the wood. The depressed portions $c$ are curvilinear in cross-section, thereby increasing their capacity and the hold of the screw upon the wood.

I am aware that it is not new to provide a screw with threads pointing upward; but such screws are not tapering, and the depressions thereof are not curvilinear in cross-section. Consequently they are not well adapted to my uses, especially as untapered screws cannot readily be driven into wood.

Having thus described my invention, what I claim as new, and desire to secure by Letters Patent, is—

1. The screw having angular threads, the outer angles whereof point toward the head, and the upper face or faces toward the head are countersunk in curvilinear form, substantially as and for the purpose set forth.

2. A screw having a tapering point and threads the edges of which point upwardly, and the upper faces of which are depressed to form recesses or pockets for the reception of wood, substantially as and for the purpose set forth.

WILLIAM SCHILLING.

Witnesses:
JOHN A. WIEDERSHEIM,
GEO. L. PLITT.